J. KINTZ.
Drop-Handle.

No. 224,702.  Patented Feb. 17, 1880.

WITNESSES:
Henry N. Miller
C. Sedgwick

INVENTOR:
J. Kintz
BY Munn & Co
ATTORNEYS.

UNITED STATES PATENT OFFICE.

JOSEPH KINTZ, OF WEST MERIDEN, CONNECTICUT, ASSIGNOR TO HIMSELF AND PATRICK J. CLARK, OF SAME PLACE.

DROP-HANDLE.

SPECIFICATION forming part of Letters Patent No. 224,702, dated February 17, 1880.

Application filed October 11, 1879.

*To all whom it may concern:*

Be it known that I, JOSEPH KINTZ, of West Meriden, Connecticut, have invented an Improvement in Drop-Handles, of which the following is a specification.

The object of the invention is to prevent the knob from swinging in any but a vertical plane to and from the drawer and the lapped portion from straightening out.

Figure 1:
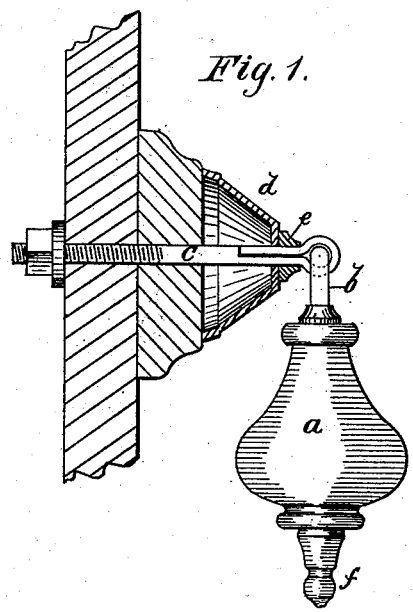
Figure 2:
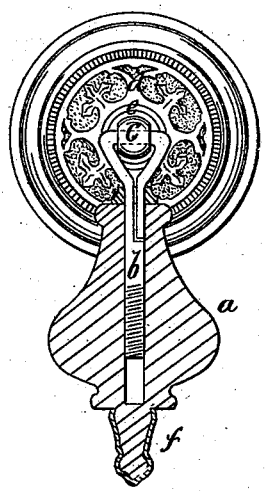

Figure 1 of the drawings is an elevation, the washers being in section. Fig. 2 is an end elevation, showing the knob in section.

$a$ represents the knob, having the cap $f$ shrunk thereon; $b$ $C$, the screw-bolts, that are connected by eyes; and $d$ $e$, the washers.

The screw-bolt C has a straight eye, and is equal in diameter throughout its length, while the eye of the screw-bolt $b$ is bent to the form of a triangle, in order to produce a straight limb transverse to the straight eye of screw-bolt C, so that when the two are united, as shown in the drawings, the knob will be prevented from swinging in any other than a vertical plane to and from the drawer.

The lapped portion of screw-bolt C is prevented from straightening out by the washers $d$ $e$ when the straight limb of the triangle is fitted snugly in the straight eye of screw-bolt C.

Having thus described all that is necessary to a full understanding of my invention, what I claim as new is—

In a drop-handle, the combination of the screw-bolt C, having a straight eye, the washers $d$ $e$, the screw-bolt $b$, having a triangular eye, and the knob $a$, as shown and described.

JOSEPH KINTZ.

Witnesses:
 WILBUR F. DAVIS,
 CHARLES W. MANN.